United States Patent [19]

Hampshire

[11] 4,130,154
[45] Dec. 19, 1978

[54] CURVED REINFORCED SUPPORT MEMBER

[75] Inventor: William J. Hampshire, Peninsula, Ohio

[73] Assignee: The Goodyear Tire & Rubber Company, Akron, Ohio

[21] Appl. No.: 803,358

[22] Filed: Jun. 3, 1977

Related U.S. Application Data

[63] Continuation of Ser. No. 611,979, Sep. 10, 1975, abandoned.

[51] Int. Cl.² .................................................. B60C 5/00
[52] U.S. Cl. ............................... 152/158; 152/330 RF
[58] Field of Search .......... 152/158, 357, 358, 330 RF; 428/113, 156, 161, 164

[56] References Cited

U.S. PATENT DOCUMENTS

| | | | |
|---|---|---|---|
| 3,385,749 | 5/1968 | Hampshire | 428/113 |
| 3,872,907 | 3/1975 | Curtiss, Jr. et al. | 152/158 |

Primary Examiner—Albert J. Makay

Attorney, Agent, or Firm—Frederick K. Lacher; J. A. Rozmajzl

[57] ABSTRACT

A support member curved about an axis of revolution for mounting on a wheel rim inside a tire chamber to support the tire in a deflated condition. The support member has a generally U-shaped cross section and may have open ends or the ends may be closed with webs having edges joining the radially inner and outer peripheral edges of the support member.

A relatively lightweight high-strength material such as reinforced plastic may be used in the construction of the support member with relatively long fibers of reinforcing material extending generally in planes containing the axis of revolution and relatively short fibers of reinforcing material extending generally circumferentially of the support member and in planes perpendicular to the axis of revolution. Heat-conducting material in the form of wire screen or short lengths of wire may be embedded in the support member to conduct heat away from the surface engaged by a deflated tire.

19 Claims, 12 Drawing Figures

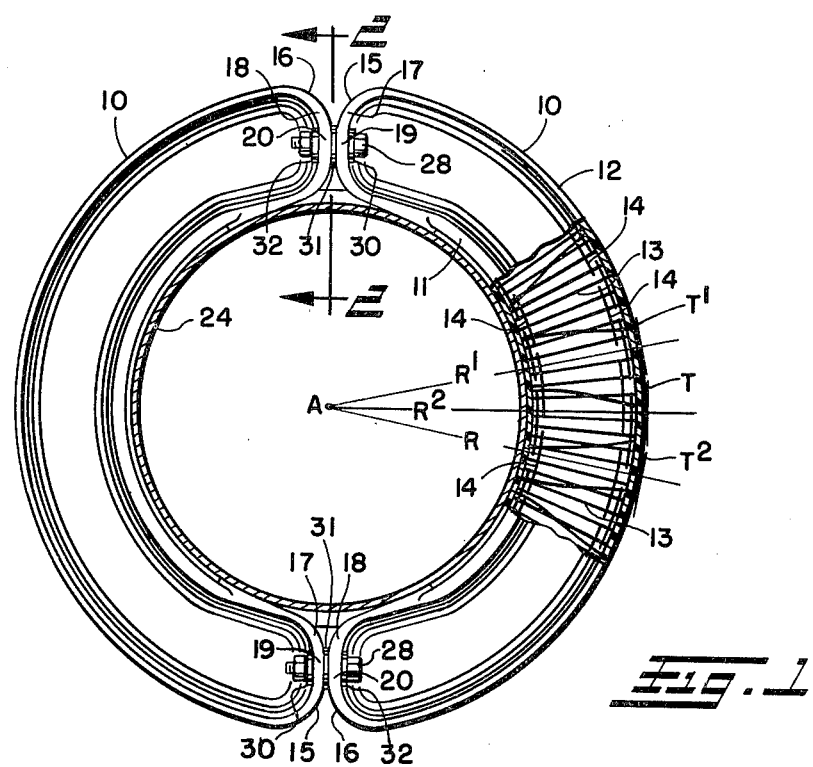
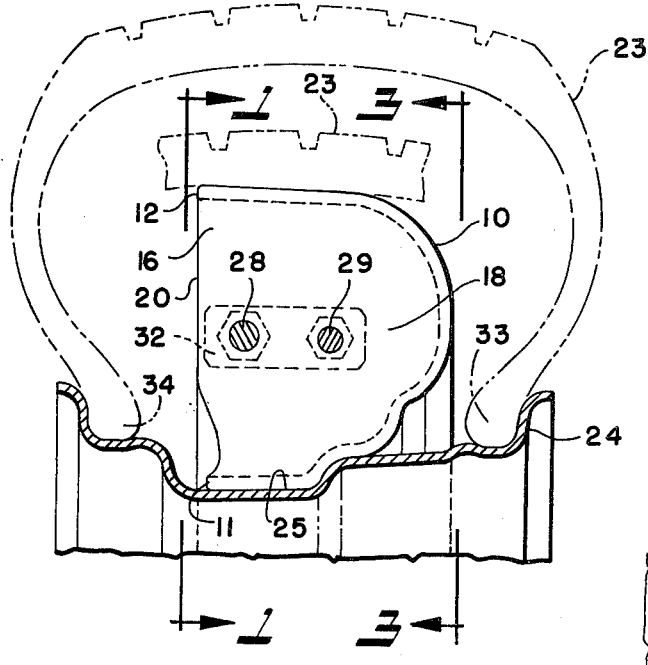
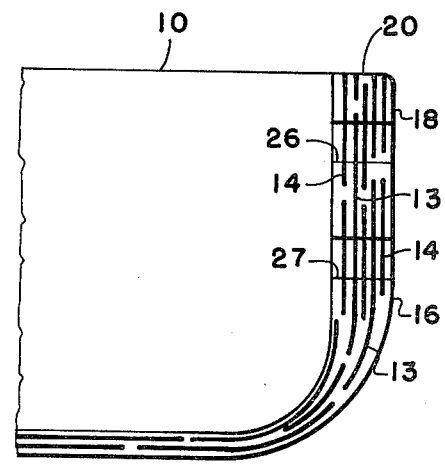

CURVED REINFORCED SUPPORT MEMBER

This is a continuation of application Ser. No. 611,979 filed Sept. 10, 1975 now abandoned.

This invention relates generally, as indicated, to the construction of a curved support member for mounting on a cylindrical surface such as a rim of a passenger car wheel. An open ended support of this type is shown in U.S. Pat. No. 3,872,907 and U.S. patent application Ser. No. 498,509 filed Aug. 19, 1974 and assigned to the assignee of this application. The open ended support construction described in U.S. patent application Ser. No. 498,509 is made of plastic reinforced with fiberglass fibers in the form of a fabric or may be used randomly or oriented in some particular pattern within the plastic wall of the support device. The support also has thickened end portions which are built up by adding more fiberglass reinforced plastic in the thickened area.

It is well known to achieve high strength of reinforced plastics by using filament winding to provide the desired fiber orientation; however, the filament winding process requires costly equipment and is time consuming. Consequently the cost of the filament wound parts is relatively high. It is also known to reinforce elongated plastic members with cut lengths of fibers and a laminated construction utilizing fiberglass fibers is the subject matter of applicant's U.S. Pat. No. 3,385,749. With curved members such as rings or segments of rings, however, filament winding has been utilized heretofore to provide the necessary high strength.

Semicircular metal tire supports having a generally U-shaped cross section and a plurality of radial ribs including ribs at the ends have been proposed; however, no provision has been made for mounting of the supports on the rim before the tire is mounted on the rim and also mounting of the supports requires attachment of the support directly to the rim. The ribs also have not provided resiliency of the tire support.

In the prior art of tire support systems, lubricating and cooling fluid have been used to reduce the heat generated by the interaction between the deflated tire and the radially outer surface of the tire support. This has presented problems of installation of containers and release of the fluid at the proper time which could be reduced or avoided by conducting heat away from the radially outer surface of the tire support.

With the foregoing in mind, it is a principal object of this invention to provide an improved fiber reinforced curved plastic body with relatively long fibers oriented in the radial and circumferential directions.

Another object of this invention is to provide for reinforcement of a curved body having a U-shaped cross section with radially inner and outer edges.

A further object is to provide a curved body with a U-shaped cross section having a closed end construction for supporting the sides of the body and a connecting member to which another curved body may be fastened.

A still further object is to provide connectors between adjacent curved bodies.

Another object is to provide a closed end construction having uniform deflection from end to end.

A further object is to provide for conduction of heat between different portions of the body.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but some of the various ways in which the principles of the invention may be employed.

In the annexed drawings:

FIG. 1 is a cross-sectional view taken along the plane of line 1—1 in FIG. 2 showing a side elevation of one embodiment of the invention mounted on a rim with parts broken away to illustrate the positioning of the reinforcing fibers.

FIG. 2 is a cross-sectional view taken along the plane of line FIG. 2—2 of FIG. 1 and showing the contour of the tire in chain-dotted lines mounted on the rim in the inflated condition and in the deflated condition.

FIG. 4 is a fragmentary sectional view of the end portion of the support taken along the plane of line 4—4 of FIG. 3 illustrating the positioning of the reinforcing fibers.

Figure 3:
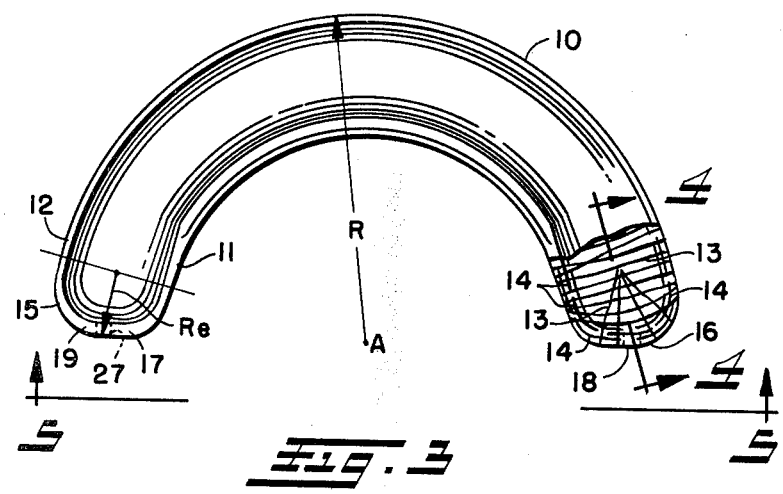
FIG. 3 is a side elevation of one of the semi-circular tire supports shown in FIG. 1 taken along the plane of line 3—3 of FIG. 2 with parts broken away to illustrate the positioning of the reinforcing fibers at the end.
Figure 6:
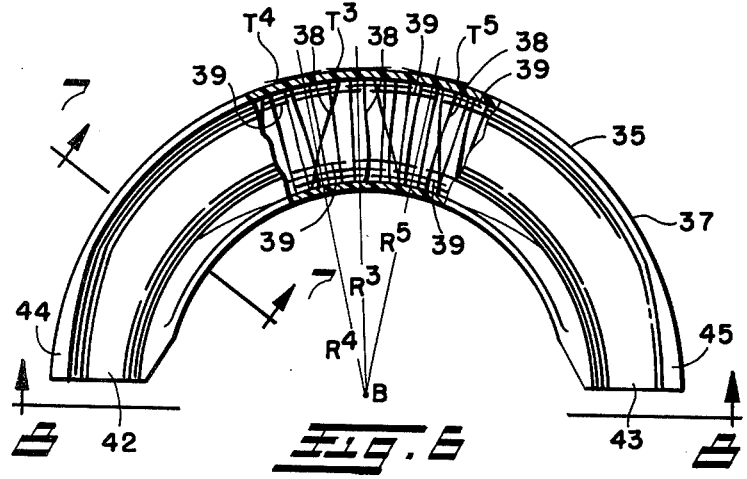

FIG. 6 side elevation, like FIG. 3, of a modified semicircular support embodying the invention with parts broken away to illustrate the positioning of the fibers.

Figure 7:
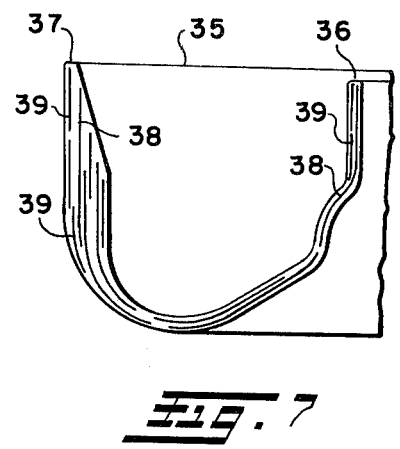

FIG. 7 is a fragmentary cross-sectional view taken along the plane of line 7—7 of FIG. 6.

Figure 8:
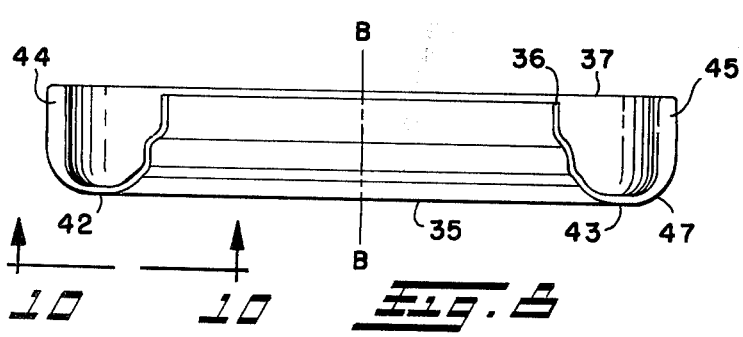

FIG. 8 is an end view taken along the plane of line 8—8 of FIG. 6.

Figure 9:
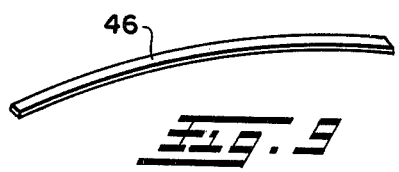

FIG. 9 is a view of one of the reinforcing rovings or ribbons from which the fibers are cut.

Figure 10:
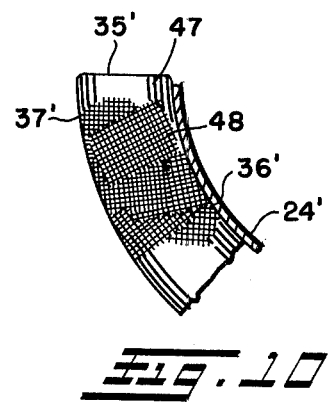

FIG. 10 is a fragmentary view taken along the plane of line 10—10 of FIG. 8 showing a further modification with parts broken away to illustrate the positioning of the heat-conducting material.

Figure 11:
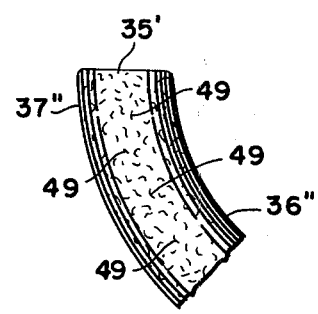

FIG. 11 is a view like FIG. 10 of a still further modification with parts broken away to illustrate the positioning of the heat-conducting wires.

Figure 12:

FIG. 12 is an enlarged view of one of the heat-conducting wires.

Figure 5:
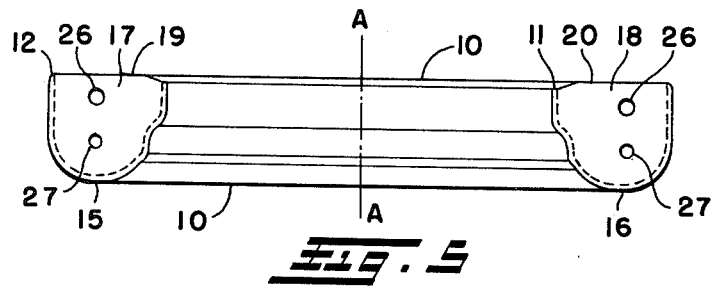
FIG. 5 is an end view taken along the plane of line 5—5 of FIG. 3.

Referring to FIGS. 1, 3 and 5, a curved body which in this case is a tire safety support member 10 is shown having an axis of revolution A—A and a radius of curvature R. The support member 10 has a generally U-shaped cross section with a radially inner portion such as inner peripheral edge 11 and a radially outer portion such as outer peripheral edge 12. To provide the resilience and strength for a tire safety support, the support member 10 is made of a reinforced plastic material in which the plastic may be a thermosetting resin such as epoxy, polyester, phenolic, polyurethane or silicone. The reinforcement is of fiberglass ribbon or roving impregnated with resin prior to positioning in the support member 10 and which has been cut into relatively long fibers 13 and relatively short fibers 14.

A representative group of the long fibers 13 and short fibers 14 are shown in heavy lines in the drawings. Substantially all the long fibers 13 are positioned in planes containing the axis of revolution A—A of the support member 10 ± 20° and these planes are indicated by radii of curvature of the support member designated R, R1 and R2 in FIG. 1. The long fibers also extend into the member 10 from the inner peripheral edge 11 and outer peripheral edge 12.

The short fibers 14 have a length about one-half the length of the long fibers 13 and extend generally circumferentially of the support member 10 in planes perpendicular to the axis of revolution A—A of the support member ± 20°. These planes are indicated by lines T, T1 or T2 perpendicular to the radii R, R1 and R2 shown in FIG. 1. In this embodiment around 60 percent by volume of the fibers are long fibers 13 and 40 percent by volume are short fibers 14. The majority of the short fibers 39 are in the edges portion.

The support member 10 has closed ends 15 and 16 with structural members such as webs 17 and 18 at the ends 15 and 16, respectively. The webs 17 and 18 have a generally convex configuration with a radius Re which may be equal to approximately one-half the radial distance between the inner peripheral edge 11 and outer peripheral edge 12 of the support member 10.

The webs 17 and 18 have peripheral edges 19 and 20, respectively, extending between the inner peripheral edge 11 and outer peripheral edge 12 of the support member 10. The long fibers 13 and short fibers 14 may be laid up in the thermosetting resin and molded to the desired shape at a predetermined pressure and temperature in accordance with the method set forth in my copending application on Method and Apparatus for Manufacturing Curved Bodies of Fiber Reinforced Plastic which issued as U.S. Pat. No. 3,988,089 or by other suitable means.

The curved webs 17 and 18 at the ends 15 and 16 of the support member 10 have a hoop strength which supports the outer peripheral edge 12 while at the same time providing resiliency of the support member. The curved configuration of the webs 17 and 18 also affects the ride of a vehicle supported in the deflated condition in that the curved ends 15 and 16 may produce a warning signal to the driver of the vehicle.

As shown in FIGS. 1 and 2, the support member 10 is semicircular and two of the support members are fastened together to make a tire supporting ring for mounting on a rim 24. In the embodiment shown, the rim 24 is of a drop center type with a well 25 extending circumferentially of the rim. Openings 26 and 27 may be provided in the webs 17 and 18 of the closed ends 15 and 16 for receiving fasteners such as bolt and nut assemblies 28 and 29 extending through plate washers 30, 31 and 32 for clamping the webs 17 and 18 of adjacent support members 10 together around the rim 24 in the well 25.

The tire 23 has a first bead 33 and a second bead 34 for mounting on the rim 24. The tire supporting ring is made up of two support members 10 which are inserted in the tire prior to mounting on the rim 24. The first bead 33 is then mounted on the rim 24 and the support members 10 connected with the bolt and nut assemblies 28 and 29 extending through the plate washers 30, 31 and 32. By using spaced-apart openings 26 and 27 and the spaced-apart bolt and nut assemblies 28 and 29, the support members 10 are held in position to resist relative turning of the connected support members.

After the support members 10 are connected, the second head 34 may be inserted in the well and in the U-shaped cavity of one support member 10 between the closed ends 15 and 16 of that support member. This permits movement of the other portion of the second bead 34 over the flange of the rim 24 and into position for mounting on the rim as shown in FIG. 2. It can be seen that by having a continuous opening between the closed ends 15 and 16, space is provided for mounting the tire after the support members 10 are fastened together and mounted securely in place in the wheel well 25.

As shown in FIG. 2, the outer peripheral edge 12 of the support member 10 is spaced from the tire 23 in the inflated condition and is in supporting relationship with the tire in the deflated condition.

Referring to FIGS. 6, 7 and 8, a modification of the invention is shown in which a semicircular curved body such as support member 35 has an axis of revolution B—B and a radius of curvature R3. The support member 35 is generally U-shaped with a radially inner portion such as inner peripheral edge 36 and a radially outer portion such as outer peripheral edge 37. The support member 35 is made of a fiberglass ribbon or roving impregnated with resin prior to positioning in the support member and which has been cut into relatively long fibers 38 and relatively short fibers 39. The long fibers 38 are positioned in planes containing the axis of revolution B—B of the support member 35 ± 20° and these planes are indicated by radii of curvature designated by letters R3, R4 and R5 in FIG. 6. The short fibers 39 extend in a direction generally circumferential of the support member 35 in planes perpendicular to the axis of revolution B—B of the support member ± 20°. These planes are designated by tangential lines T3, T4 and T5. The majority of the short fibers 39 are in the edge portions. In order to illustrate the positioning of the long fibers 38 and short fibers 39, a few representative fibers are shown in heavy lines in FIGS. 6 and 7; however, the support member 35 is built up of many long fibers 38 and short fibers 39 in overlapping relationship.

The support member 35 has ends 42 and 43 so that two support members can be connected together by suitable apparatus to provide a tire safety support ring similar to that shown in FIG. 1 for the first modification of the invention. In this case, however, the ends 42 and 43 are open such that the end portions 44 and 45 of the outer peripheral edge 37 at the ends 42 and 43, respectively, need to be reinforced to resist excessive deflection. According to this invention, the end portions 44 and 45 have a greater thickness than the intermediate portion between the end portions 44 and 45 of the outer peripheral edge 37. This is provided by increasing the number of overlapping long fibers 38 and short fibers 39 in the end portions 44 and 45 so that there are a greater number of fibers in the end portions for a given length than in the outer peripheral edge 37 at a portion intermediate the end portions.

The support member 35, as shown in FIGS. 6, 7 and 8, is semicircular; however, in manufacturing the support member in accordance with the method set forth in my copending patent application which issued as U.S. Pat. No. 3,988,089 two support members may be made in a one-piece annulus and after molding be cut into two pieces for installation on a drop center rim of the type shown in FIG. 2. The support members 35 may also be molded in a semicircular configuration.

With reference to FIG. 9, a relatively flat ribbon or roving 46 of fiberglass is shown from which the long fibers 13 and short fibers 14 as well as the long fibers 38 and short fibers 39 are severed for incorporation in the modifications of FIGS. 1 through 5 and 6 through 8. The ribbon 46 is impregnated with resin prior to cutting into the shorter fibers to maintain fiber strand stiffness and the integrity and orientation of the fibers as they are laid in overlapping relationship to make the support members 10 and 35. The resin sizing is preferably from 3 to 5 percent by weight but could be from 1 to 25 percent by weight depending upon the material being used. The amount of resin added to the oriented overlapping fibers 13 and 14 and 38 and 39 is determined by the amount needed in the final cured part and will hold the preforms for the support members 10 and 35 together during handling in such a manner that the fiber orientation will not be disturbed. Also, the resin system viscosity is increased by partial cure between fabrication and curing to the level necessary for compression molding without separation of the resin from the fibers during closure, flow and fill-out of the mold.

Referring to FIG. 10, an outer surface 47 of the support member 35' is shown in which heat-conducting wire in the form of screen 48 is embedded in the surface 47 of the the support member for conducting heat from the outer peripheral edge 37' to the inner peripheral edge 36' during operation of the tire safety support member 35' in the deflated condition of the tire. In that condition, the tire 23 rubs against the support member 35' at the outer peripheral edge 37' generating heat which could damage the tire or the support member if not dissipated. With the construction shown in FIG. 10, the screen 48 will transmit the heat from the outer peripheral edge 37' to the inner peripheral edge 36' which engages the metal rim 24' to transmit heat to the rim for radiation of the heat into the air.

Another modification is shown in FIG. 11 of the support member 35" in which short sections 49 of heat-conducting wire 50 are embedded in the support member 35" in overlapping relationship for transmitting the heat from the outer peripheral edge 37" to the inner peripheral edge 36". It is also contemplated that other heat-conduction materials may be embedded in the outer surface or body of the support member 35" for conducting the heat away from the outer peripheral edge 37".

While certain representative embodiments and details have been shown for the purpose of illustrating the invention, it will be apparent to those skilled in the art that various changes and modifications may be made therein without departing from the spirit or scope of the invention. This is especially true with respect to annular rings and segments of rings where the unique positioning of the fibers of reinforcing material in accordance with this invention provide controlled deflection and high strength at the minimum cost of manufacture. Also the semicircular tire support with the closed ends of FIGS. 1 through 5 may be made from other materials in addition to fiber reinforced plastic, steel or aluminum where the other materials have the required strength and resiliency.

What is claimed is:

1. A fiber reinforced body of plastic material in which said body is curved about an axis of revolution and has a generally U-shaped cross section with an inner peripheral edge portion and an outer peripheral edge portion comprising a plurality of relatively long fibers of reinforcing material extending into said body from said edge portions generally in planes containing the axis of revolution of said body and a plurality of relatively short fibers of reinforcing material extending generally circumferentially of said body and in planes perpendicular to the axis of revolution of said body and the majority of said relatively short fibers being in said edge portions.

2. A fiber reinforced body of plastic material according to claim 1 wherein said body has end portions and intermediate portions between said end portions, said end portions having a greater thickness than the intermediate portions and the number of said long fibers and said short fibers adjacent said end portions being greater than the number of said long fibers and said short fibers at said intermediate portions whereby said end portions have greater strength to resist deflection than said intermediate portions to provide uniform deflection around said body.

3. A fiber reinforced body of plastic material according to claim 1 wherein said plastic material is a resin and said body is compression molded.

4. A fiber reinforced body of plastic material according to claim 3 wherein said fibers are fiberglass with said short fibers having a length of about one-half the length of said long fibers.

5. A fiber reinforced body of plastic material according to claim 1 wherein said long fibers and said short fibers are cut and laid up in overlapping relation to provide the desired thickness of the body.

6. A fiber reinforced body of plastic material according to claim 1 wherein said body has closed end portions with each of said end portions including a web connecting said inner peripheral edge portion with said outer peripheral edge portion and providing a structural member for joining said body to another body at said end portions, said web having a web edge connecting the edges of said outer and said inner peripheral edge portions, a multiplicity of said relatively long fibers disposed between said web edge and the edges of said peripheral edge portions and extending in a direction generally away from said web edge, said relatively short fibers being parallel to said web edge of each of said closed end portions.

7. A fiber reinforced body of plastic material according to claim 6 wherein said web is curved to provide said end portions with a convex configuration.

8. A fiber reinforced body of plastic material according to claim 7 wherein said web has a radius substantially equal to one-half the radial distance between said inner peripheral edge portion and said outer peripheral edge portion.

9. A fiber reinforced body of plastic material according to claim 1 wherein said body has a heat-conducting means at the surface for conducting heat from said radially outer peripheral edge portion towards said radially inner peripheral edge.

10. A fiber reinforced body of plastic material according to claim 1 wherein said body has a plurality of overlapping heat-conducting wires embedded in said body for conducting heat from said radially outer peripheral edge portion to said radially inner peripheral edge.

11. A fiber reinforced body of plastic material according to claim 1 wherein said long fibers and said short fibers are severed portions of a flat ribbon.

12. A fiber reinforced body of plastic material in which said body is curved about an axis of revolution with an inner peripheral edge portion and an outer peripheral edge portion comprising a plurality of relatively long fibers of reinforcing material extending into said body from said edge portions generally in planes containing the axis of revolution of said body and a plurality of relatively short fibers of reinforcing material extending generally circumferentially of said body and in planes perpendicular to the axis of revolution of said body and the majority of said relatively short fibers being in said edge portions.

13. A fiber reinforced body of plastic material in which said body is curved about an axis of revolution with an outer peripheral edge portion comprising a plurality of relatively long fibers of reinforcing material extending into said body from said edge portion generally in planes containing the axis of revolution of said body and a plurality of relatively short fibers of reinforcing material extending generally circumferentially of said body and in planes perpendicular to the axis of revolution of said body and the majority of said relatively short fibers being in said edge portion.

14. A tire safety support for use on a wheel rim to support a pneumatic tire mounted thereon in a deflated condition comprising a body of compression molded resin curved about an axis of revolution and having a generally U-shaped cross section with an inner peripheral edge portion and an outer peripheral edge portion comprising a plurality of relatively long fibers of reinforcing material extending into said body from said edge portions generally in planes containing the axis of revolution of said body and a plurality of relatively short fibers of reinforcing material extending generally circumferentially of said body and in planes perpendicular to the axis of revolution of said body and the majority of said relatively short fibers being in said edge portions.

15. A tire safety support according to claim 14 wherein said body of compression molded resin has closed end portions with each of said end portions including a web having a web edge connecting the edges of said inner peripheral edge portion and said outer peripheral edge portion, said web providing a structural member for joining said body to another body, and said inner peripheral edge portion and said outer peripheral edge portion only being connected at said closed ends whereby space is provided for a bead portion of the tire during mounting on a rim.

16. A tire safety support according to claim 15 wherein each of said closed end portions has at least one opening for receiving a fastener connected to another tire safety support body.

17. A tire safety support according to claim 15 wherein each of said closed end portions has at least two openings spaced apart for receiving fasteners connected to another tire safety support body to prevent relative rotation of the connected bodies.

18. A fiber reinforced body of plastic material in which said body is curved about an axis of revolution with a radially inner portion and a radially outer portion comprising a plurality of relatively long fibers of reinforcing material extending into said body from said inner and said outer portions in a generally radial direction of said body and a plurality of relatively short fibers of reinforcing material extending in a generally circumferential direction of said body and the majority of said relatively short fibers being in said inner and outer portions.

19. A fiber reinforced body of plastic material in which said body is curved about an axis of revolution with a radially outer portion comprising a plurality of relatively long fibers of reinforcing material extending into said body from said outer portion in a generally radial direction of said body and a plurality of relatively short fibers of reinforcing material extending in a generally circumferential direction of said body and the majority of said relatively short fibers being in said radially outer portion.

* * * * *